2,813,104
Patented Nov. 12, 1957

2,813,104

PREPARATION OF MEPHENESIN CARBAMATE HEMIHYDRATE

Wilbur B. McDowell, East Brunswick Township, N. J., assignor to Olin Mathieson Chemical Corporation, New York, N. Y., a corporation of Virginia No Drawing. Application November 2, 1954,
Serial No. 466,447

4 Claims. (Cl. 260—340.2)

This invention relates to the preparation of dioxolones and carbamates, and more particularly to the preparation of 3-aryloxy-1,2-alkanediol 1,2-carbonates and 2-aryloxy-1,2-alkanediol 1-carbamates.

Prior to this invention 3-aryloxy-1,2-alkanediol 1,2-carbonates were prepared by the reaction of phosgene with 3 - aryloxy - 1,2 - alkanediols. This process is subject to certain disadvantages due to the phosgene reactant which is a toxic gas hazardous to handle, so that care must be taken to prevent escape of the gas from the reaction mixture. Furthermore, since hydrogen chloride is a by-product of the phosgenation reaction, an acid-acceptor, such as a tertiary base, has to be incorporated into the reaction mixture in order to bind the hydrogen chloride and obtain economically-feasible yields of the desired product.

I have found that 3 - aryloxy - 1,2 - alkanediol 1,2-carbonates may be prepared without the use of phosgene, and therefore with the elimination of the above disadvantages, by reacting a carbonic acid ester such as a glycol carbonate or a di(lower alkyl) carbonate with a 3 - aryloxy - 1,2 - alkanediol in the presence of a basic condensation catalyst. The 3 - aryloxy - 1,2 - alkanediol 1,2 - carbonate thus obtained may then be converted to the corresponding carbamate by reacting the former with ammonia or a non-tertiary (primary or secondary) amine.

I have also found that this reaction of the carbonate with ammonia or a non-tertiary amine is advantageously carried out in an aqueous solvent, the 3-aryloxy-1,2-alkanediol 1-carbamate being generally obtained thereby in the form of a hydrate. Thus, reaction of 3-o-toloxy - 1,2 - propanediol 1,2 - carbonate with aqueous ammonia, with at least one-half mole water present per mole carbonate, results in the formation of 3-o-toloxy-1,2 - propanediol 1 - carbamate hemihydrate, i. e., mephenesin carbamate hemihydrate. The latter is superior to the anhydrous form, since it more readily forms a suspension, and unlike its anhydrous form does not tend to settle and cake with passage of time. Furthermore, when administered perorally, the hemihydrate has the added advantage that it is less bitter in taste than the corresponding anhydrous form.

Since the reaction of the carbonic acid ester and the 3 - aryloxy - 1,2 - alkanediol is reversible, it is advantageous (to insure completeness of the reaction) to employ as the carbonic acid ester reactant one whose alcohol moiety (glycol or alkanol) is relatively volatile, and thus can be removed from the reaction zone by heat and/or vacuum. Any carbonic acid ester may be used, provided that the alcohol moiety thereof is more volatile than are the 3 - aryloxy - 1,2 - alkanediol and the carbonic acid ester reactants. Suitable carbonic acid esters fulfilling the above requirement include: (I) the cyclic glycol carbonates, such as the carbonates of lower alkanediols (e. g., ethylene glycol, 1,2-propanediol, 1,3-propanediol, 2 - methyl - 1,2 - propanediol, 1,2 - butanediol, 1,3 - butanediol, 2,3 - butanediol, pinacol, 3 - methyl - 1,2 - butanediol, and 2 - methyl - 2,3 - butanediol); and (II) the acyclic carbonates, such as the carbonates of lower alkanols (e. g., diethyl carbonate, dimethyl carbonate, diisopropyl carbonate, ethylmethyl carbonate, and ethyl propyl carbonate).

Suitable 3 - aryloxy - 1,2 - alkanediols for use in the process of this invention include the 3 - aryloxy - 1,2-(lower alkanediols) such as: 3 - phenoxy - 1,2 - propanediol; 3 - (o, m, or p - toloxy) - 1,2 - propanediol; 3 - phenoxy - 1,2 - butanediol; 3 - (o, m, or p - toloxy)-1,2 - butanediol; 1 - phenoxy - 2,3 - butanediol; 1 - (o, m, or p - toloxy) - 2,3 - butanediol; 1,2 - propanediol; 3 - (o, m, or p - cyclohexylphenoxy) - 1,2 - propanediol; 3 - (o, m, or p - aminophenoxy) - 1,2 - propanediol; 3 - (o, m, or p - chlorophenoxy) - 1,2 - propanediol; 3-(o, m, or p-anisoloxy)-1,2-propanediol; and 3-(o, m, or p - biphenyloxy) - 1,2 - propanediol; the 3 - aryloxy-1,2 - propanediols being preferred.

The carbonic acid ester and 3-aryloxy-1,2-alkanediol are most advantageously reacted in the presence of a basic condensation catalyst, such as an alkali-metal salt of a weak acid (e. g. sodium bicarbonate, sodium acetate, potassium bicarbonate, and potassium carbonate), an alkali-metal alcoholate (e. g. an alkali-metal lower alkylate such as sodium methylate, sodium ethylate or potassium methylate), or an alkali-metal base (e. g. sodium hydroxide and potassium hydroxide).

The reaction is conducted by heating the carbonic acid ester and alkanediol to the boiling point of the alcohol moiety of the ester reactant for a period of time in the range of about 0.5 hour to about 8 hours (preferably about 2 hours). Although the ester and alkanediol may be mixed in any proportion, at least one mole of ester per mole of alkanediol (preferably at least 1.5 moles of ester per mole of alkanediol) should be used for maximizing the yield. The reaction may be carried out at any suitable pressure, such as ambient pressure, but is preferably conducted at a reduced pressure in the range of about 1 mm. to about 10 mm. of mercury, so as to assist in the removal of the alcohol (e. g. glycol or lower alkanol) formed as a product of the reaction. Although the amount of basic condensation catalyst used in the reaction is not critical, a suitable concentration of catalyst is in the range of about 0.05% to about 2.0% by weight based on the alkanediol reactant. After the reaction has been completed, the temperature of the reaction mixture may be raised to the boiling point of the excess carbonic acid ester (if any) in order to remove this reactant.

Suitable amines for reaction with the 3-aryloxy-1,2-alkanediol 1,2-carbonate obtained to form the carbamate include, inter alia: ammonia; primary amines, such as methyl amine, ethyl amine and benzyl amine; and secondary amines, such as dimethyl amine, diethylamine, pyrrolidine, piperidine, and morpholine.

As pointed out hereinbefore, the reaction of the carbonic acid esters and the ammonia or amine is advantageously carried out in an aqueous system such as water alone, or water mixed with a suitable organic solvent, inter alia, aqueous alcohols (e. g. aqueous ethanol or methanol), aqueous ketones (such as water plus methyl ethyl ketone), aqueous organic esters (such as water plus ethyl acetate), and water plus non-polar solvents (such as trichloroethylene and benzene). In order to form the desired hemihydrate in the case of 3-o-toloxy-1,2 - propanediol 1 - carbamate, mephenesin carbamate, at least one-half mole of water per mole of carbonate reactant must be present. The reaction is conducted at, for example, room temperature, for about 1 to 24 hours, using at least one mole of ammonia or amine per mole of carbonate.

If an anhydrous carbamate is desired, the hydrate initially formed by the reaction may be dehydrated by heating to drive off the water of hydration. The anhydrous form of the carbamate may also be formed directly by carrying out the amidation reaction under substantially anhydrous conditions and an example of such a process is given hereinafter (Example 7).

The following examples are merely illustrative and are in no way to be considered limiting (the compound 3-o-toloxy-1,2-propanediol being referred to, for convenience, by its recognized name "mephenesin," 4-o-toloxymethyl-dioxolone-2 being accordingly referred to as "mephenesin carbonate," and 3 - o - toloxy - 1,2 - propanediol 1-carbamate as "mephenesin carbamate"):

EXAMPLE 1

Mephenesin carbamate (a) *Mephenesin carbonate.*—182 g. of mephenesin and 132 g. of ethylene carbonate [dioxolone-2] are melted together. 0.1 g. of sodium bicarbonate is added, and the mixture subjected to vacuum distillation. A mixture of ethylene glycol and ethylene carbonate distilling up to 88° C. at 1.5 mm. is collected (pot temperature up to 135–140° C.). The residue, mephenesin carbonate (or 3-o-toloxymethyl-dioxolone-2), is used without further purification in the next step of the process.

(b) *Mephenesin carbamate hemihydrate.*—10 g. of the crude mephenesin carbonate is dissolved in 20 cc. of trichloroethylene and added with good stirring to 60 cc. of concentrated ammonium hydroxide. The mixture is vigorously agitated for three hours at 25–35° C. It is then cooled to 5° C., maintained at this temperature for two hours, filtered and dried. The crude carbamate is recrystallized from 50% aqueous methanol by dissolving in the hot solvent, clarifying by filtration, cooling to 5° C. for two hours and filtering.

(c) *Mephenesin carbamate.*—The mephenesin carbamate hemihydrate may, if desired, be converted to the anhydrous mephenesin carbamate by heating the former to a temperature of 70° C. at 20 mm. pressure for 3 hours.

EXAMPLE 2

Mephenesin carbonate 182 g. of distilled mephenesin and 132 g. of ethylene carbonate are melted together. Sodium methylate (0.1 g.) is added, and the mixture heated to a temperature of 150° C. under reduced pressure. About 104.4 g. of distillate, distilling over a temperature range of 73° C.–90° C. at 3±1 mm. Hg pressure, is collected after 2 hours. The residue (about 209 g.) is dissolved in 400 ml. of trichloroethylene and stored at 5° C. overnight. The crystalline product is removed by filtration and air dried. About 177.3 g. (85% yield) mephenesin carbonate is recovered, melting at about 93–96° C.

By substituting 182 g. of 3-m-toloxy-1,2-propanediol for mephenesin in Example 1(a), 4-m-toloxymethyl-dioxolone-2 is obtained in about 75% yield.

By substituting 182 g. of 3-p-toloxy-1,2-propanediol for mephenesin in Example 1(a), 4-p-toloxymethyl-dioxolone-2 is obtained.

By substituting 168 g. of 3-phenoxy-1,2-propanediol for mephenesin in Example 1(a), 4-phenoxymethyl-dioxolone-2 is obtained.

EXAMPLE 3

Mephenesin carbamate hemihydrate 91 g. of mephenesin, 66 g. of ethylene carbonate, and 0.1 g. of sodium methylate are mixed together and heated under reduced pressure for ninety minutes. The distillate, which consists of ethylene glycol and excess ethylene carbonate, is collected at 80 to 100° C. at 7 mm. The temperature of the reaction mixture ranges from 90 to 145° C. during this distillation. The residue is cooled to below 70° C. and dissolved in 100 ml. of methyl ethyl ketone. The solution is added rapidly with good agitation to 200 ml. of concentrated ammonium hydroxide at 30–35° C. The mixture is stirred for two hours and then the methyl ethyl ketone is distilled off. Ethyl alcohol (150 ml.) is added to the residue and the mixture is heated, clarified by filtration and 50 ml. of distilled water added. After storage at 5° C. for twelve hours, the crystalline product is removed by filtration, and the filtrate concentrated in vacuo to give a second crop of crystals. The two crops are combined and recrystallized from 350 ml. of 50% ethanol, giving about 86 g. of product melting at 76–80° C. This material is recrystallized from 400 ml. of 50% ethanol to give about 75 g. (64% yield) of mephenesin carbamate hemihydrate melting at 79–81° C.

By substituting 200 ml. of a concentrated aqueous solution of methyl amine for ammonium hydroxide in Example 3, N-methyl mephenesin carbamate is obtained.

EXAMPLE 4

Mephenesin carbamate hemihydrate 150 g. of mephenesin, 109 g. of ethylene carbonate and 0.18 g. of sodium methylate are placed in a vacuum still, and subjected to distillation at 0.6 mm. pressure. The final pot temperature is 145° C. and the vapor temperature is 78° C. This distillation removes ethylene glycol and excess ethylene carbonate. The still pot residue, amounting to about 171 g., is dissolved in 234 cc. of trichloroethylene. The trichloroethylene solution is then mixed with 815 cc. of concentrated aqueous ammonia and the mixture thoroughly agitated for three hours at 25° C. The mixture is then held at 5° C. for two hours, for crystallization of the crude carbamate, which is separated by centrifugation. The yields of wet crystals is about 194 g., corresponding to a dry weight of about 146.5 g. The wet crystals are dissolved in 386 cc. of 95% ethanol at 50° C., filtered, and diluted with 366 cc. of water. The solution is held at 5° C. for two hours, for crystallization of the carbamate hemihydrate, which is separated by centrifugation, washed with 30 cc. of cold 50% ethanol, and dried at 50° C. for twelve hours. The yield of wet crystals is about 154 g. and of dry crystals is about 133 g. (about 81%). The overall yield from mephenesin is about 69%.

EXAMPLE 5

Mephenesin carbonate 91 g. of mephenesin is mixed with 75 g. of propylene carbonate and about 0.2 g. of sodium methylate. The mixture is heated to a temperature of about 100° C. at 5 mm. pressure for 2 hours. About 60 g. of distillate is recovered and the residue is crystallized from 200 ml. of trichloroethylene yielding about 70 g. of mephenesin carbonate.

EXAMPLE 6

Mephenesin carbonate 91 g. of mephenesin, 66 g. of ethylene carbonate, and about 0.1 g. of sodium bicarbonate are mixed together and heated to a temperature of about 100° C. under 3 mm. of pressure for 4 hours. About 41 g. of distillate is given off, and the residue (about 110 g.) is recrystallized from 200 ml. of trichloroethylene yielding about 96.7 g. (93%) of mephenesin carbonate, M. P. about 89–94° C.

EXAMPLE 7

Mephenesin carbamate 96.7 g. of mephenesin carbonate, prepared by the process of Example 6, is mixed with 100 ml. of 95% ethanol and 200 ml. of concentrated ammonium hydroxide. The mixture is warmed to 40–45° C. and stirred for two hours. The mixture is then cooled to 5° C., and after one hour, is filtered and recrystallized from 200 ml. of 95% ethanol and 200 ml. of water. About 32.5 g. of mephenesin carbamate is recovered, having a M. P. of about 78–81° C.

EXAMPLE 8

*Mephenesin carbamate*

91 g. of mephenesin, 66 g. of ethylene carbonate and 2 drops of 50% sodium hydroxide are heated to about 85° C. under 3 mm. pressure for 90 minutes. About 54.2 g. of distillate is given off. The residue (about 102.7 g.) is dissolved in 100 ml. of methyl ethyl ketone and poured into 200 ml. of concentrated ammonium hydroxide. The mixture is stirred for two hours and filtered. The filtrate is concentrated in vacuo to remove the methyl ethyl ketone, and crystallized from 235 ml. of methanol and 235 ml. of water. About 53 g. of mephenesin carbamate hemihydrate is recovered, having an M. P. of 77–80° C.

The mephenesin carbamate hemihydrate may (if desired) be dissolved in 200 ml. of benzene, and the solution heated to remove the water of hydration as an azeotropic mixture with benzene. The anhydrous mephenesin having an M. P. of about 93–94° C., crystalizes from the chilled solution.

EXAMPLE 9

*Mephenesin carbonate*

75 g. of diethyl carbonate, 91 g. of mephenesin and 0.3 g. of sodium methylate are mixed and subjected to fractional distillation at atmospheric pressure. The ethyl alcohol and excess diethyl carbonate are collected at vapor temperatures of 78° C. to 125° C. The distillation is considered complete when the vapor starts to drop in spite of increasing pot temperature. About 55 g. of distillate are given off. The residue is dissolved in 200 ml. of trichloroethylene, cooled at 5° C., filtered and air dried. About 72.1 g. (70% yield) of mephenesin carbonate are obtained, melting at about 86° C. to 90° C.

By substituting an equivalent amount of other di(lower alkyl)carbonate, such as dimethyl carbonate, methyl ethyl carbonate, and diisopropyl carbonate, for the diethyl carbonate in Example 9, mephenesin carbonate is obtained in yields of about 65% to 75%.

EXAMPLE 10

*Mephenesin carbamate hemihydrate*

98.8 g. of mephenesin carbonate is melted by heating to above 95° C., and added dropwise with vigorous agitation to 600 ml. of concentrated ammonium hydroxide. The temperature of the mixture rises to 35° C., and then drops slowly to room temperature. The mixture is stirred for 3 hours after addition is completed and then chilled to 5° C. and maintained at this temperature for 2 hours. The crude product is removed by filtration and air dried. Yield about 95.6 grams (86%), M. P. about 77.0 to 80.6° C. This crude carbamate hemihydrate is recrystallized from a mixture of 240 ml. of methanol and 240 ml. of water; yield about 89.2 grams (80%), M. P. about 79.4 to 81.8° C.

EXAMPLE 11

*Mephenesin carbonate*

82 g. of mephenesin, 67.9 g. of trimethylene carbonate and 0.25 g. of sodium methylate are placed in a pot of a vacuum distillation apparatus and heated under reduced pressure. Distillate is collected at a pot temperature of 125° C. and a vapor temperature of 105–107° C. under 8 mm. mercury pressure. Heating is terminated when the pot temperature rises to 154° C. and the vapor temperature begins to drop. The pot residue is recrystallized from 400 ml. of trichloroethylene to yield about 82.7 g. (about 88.5% yield) of mephenesin carbonate, M. P. about 93–97° C.

The invention may be variously otherwise embodied within the scope of the appended claims.

I claim:

1. The process for preparing mephenesin carbamate hemihydrate, which comprises reacting mephenesin carbonate with ammonia in an aqueous system.

2. Mephenesin carbamate hemihydrate.

3. The process for preparing mephenesin carbamate hemihydrate, which comprises reacting a carbonic acid ester selected from the group consisting of a glycol carbonate and a di(lower alkyl) carbonate with mephenesin in the presence of a basic condensation catalyst, and reacting the intermediate thus formed in an aqueous system with ammonia.

4. The process of claim 3, wherein the carbonic acid ester is ethylene glycol.

References Cited in the file of this patent

UNITED STATES PATENTS

| | | |
|---|---|---|
| 1,995,291 | Carothers | Mar. 26, 1935 |
| 2,020,298 | Carothers et al. | Nov. 12, 1935 |
| 2,522,680 | Kropa et al. | Sept. 19, 1950 |

FOREIGN PATENTS

| | | |
|---|---|---|
| 689,705 | Great Britain | Apr. 1, 1953 |

OTHER REFERENCES

Ludwig et al.: JACS, 73, p. 5894 (1951).
Yale et al.: JACS, 72, pp. 3710–16 (1950).
Larkin: "The Lancet," August 14, 1954, pp. 333–334.
Dresel et al.: Proc. Soc. Exptl. Biol. Med., 79, 286–7 (1952).